Patented June 15, 1926.

1,589,328

UNITED STATES PATENT OFFICE.

LEON W. EBERLIN AND CARL L. BEAL, OF ROCHESTER, NEW YORK, ASSIGNORS TO EASTMAN KODAK COMPANY, OF ROCHESTER, NEW YORK, A CORPORATION OF NEW YORK.

AQUEOUS EMULSIONS OF ELECTRODEPOSITABLE CELLULOSIC COMPOUNDS AND COALESCING AGENTS THEREFOR.

No Drawing.      Application filed April 7, 1925. Serial No. 21,342.

This invention relates to aqueous emulsions, containing electrodepositable cellulosic compounds and coalescing agents therefor. One object of the invention is to provide an emulsion of this character suitable for electrodeposition by the process disclosed in our copending application, Serial No. 21,311, filed April 7th, 1925, for electrodeposition of coatings of cellulosic compounds. Another object of the invention is to provide such an emulsion, from which there may be deposited a coating which will blend together by reason of the presence of coalescing material therein. Still another object of the invention is to provide a process for preparing such emulsions. Other objects will hereinafter appear.

We have found that aqueous emulsions containing in the disperse phase one or more cellulosic compounds and one or more coalescing agents therefor are especially useful in coating electroconducting surfaces by electrodeposition. We have found that the coalescing agent enters into the coating with the cellulosic compound and causes particles of the latter to blend or coalesce into a firm coating. We shall now describe one embodiment of our invention for purposes of illustration. It will be understood, however, that the invention is not limited to this example, or the details thereof, except as indicated in the appended claims.

In the preferred embodiment of our invention we dissolve the cellulosic compound in a liquid which includes a coalescing agent, and then emulsify the solution in an aqueous bath containing a suitable emulgent and also preferably containing a protective colloid. We may, for example, dissolve 500 parts of cellulose nitrate, say of the kind used for films or the kind used for low viscosity lacquers, in 1500 parts by weight of amyl acetate. Next we mix 10 parts of the protective colloid, say gum arabic, for instance, and 150 parts by weight of an emulgent, say 150 parts of Turkey red oil, into 10,000 parts of water. The solution of nitrate in amyl acetate is then mixed into the aqueous bath containing the emulgent and colloid. The mixing is effected by thorough stirring or other suitable agitating process.

The above described operations give a preliminary emulsion which is useful by itself for electrodeposition. We have found that it is desirable to make the droplets of the emulsion of a more nearly uniform size. This enables the electrodeposition to be conducted better and gives a more stable emulsion. We, therefore, prefer to homogenize the above described preliminary emulsion by running it through a high-speed colloid mill, any of the well known ones which are on the market being useful for this purpose. The action of the mill is regulated to bring the droplets down to a small size, most of them having about the same order of magnitude. The emulsion is more stable if it is slightly alkaline. In any event we, of course, prefer to avoid sufficient acidity to cause coagulation of the emulsion. If desired, a small amount of alkali can, therefore, be present in the aqueous bath when the solution of cellulosic compound is mixed into it to effect the preliminary emulsification.

In place of the cellulose nitrate solution, when preparing the above emulsion, we can substitute a solution of cellulose acetate, for example 500 parts of chloroform-soluble cellulose acetate dissolved in 1500 parts of chloroform or acetylene tetrachloride. Similarly we can use 500 parts of acetone-soluble cellulose acetate dissolved in 1500 parts of acetylene tetrachloride. A cellulose ether, such as water-insoluble ethyl cellulose, may be dissolved in a mixture of equal parts of benzol and ethyl alcohol, say 500 parts of the ether and 1500 parts of the solvent mixture. Moreover, mixtures of these cellulosic compounds in common solvents may be stirred into the aqueous bath, so as to form emulsions, the droplets of which contain a plurality of cellulosic compounds, or separate emulsions of different compounds may be first prepared and then mixed together, yielding a final emulsion in which there are particles of one cellulosic compound and other particles containing a different cellulosic compound.

It will be noted that the liquids in which we dissolve the cellulosic compounds contain ingredients, such as amyl acetate, chloroform, acetylene tetrachloride, and benzol, which are practically insoluble in water. This causes them to remain in the droplets of the emulsions in useful quantities. When the droplets are electrodeposited there is sufficient of this solvent present to act as a coalescing agent. In other words the particles can be brought together into a strong, uniform or blended coating.

While we prefer to use solvent liquids containing a coalescing agent which is insoluble in water, nevertheless, it is possible to employ solvents which are miscible with water. Thus acetone may be employed to dissolve the nitrate or the acetate, or both together, before emulsification. The amount of such solvent, which passes into the aqueous bath, must, of course, be kept below a concentration which will impair the deposited coating. But, by keeping the concentration sufficient to have a softening effect on the coating the particles of the latter coalesce or blend together. In this way acetone in the bath can act as a coalescing agent. In fact we may have a coalescing agent in the aqueous phase and another, at the same time in the disperse phase. For all ordinary purposes, however, we find it satisfactory to have the coalescing agent in the droplets.

While we prefer the above mentioned emulgent, equivalent materials, such as soaps, phenolates, etc., may be wholly or partially substituted. In place of the protective colloid mentioned above, any other one having similar properties may be used, such, for example, as gelatin and glue.

One or more pigments, like lampblack, for example, may be introduced into the emulsion, either by wetting it and mixing it with the completed emulsion or preferably mixing it into the initial solution of the cellulosic compound. Likewise agents which improve the qualities of the coating may be introduced into the emulsion, say by addition to the initial solution of cellulosic compound. Thus camphor, monochlornaphthalene, triphenyl phosphate, tricresyl phosphate, and the like may be introduced into said solution in amounts which bear to the nitrocellulose the customary ratio which they bear in lacquer or film compositions. Substances of this type which increase the flexibility of the coating are customarily referred to as softeners. Preferably the coalescing agent is a common solvent of both the cellulosic compound and the softener.

The droplets in the emulsion act as if they were negatively charged. They, therefore, travel toward the anode.

When the surface has a coating of the desired thickness, it may be removed from the bath and washed with water. In the preferred form of our invention the coalescing agent in the deposited particles has caused them to blend into a coating during the plating. The coating is allowed to set or harden, say by evaporation of some of the coalescing agent from it. This setting action can be accelerated by heating. In fact the coating can be treated in any way in which coatings of cellulosic compounds are usually treated. In case the deposited particles of cellulosic compound are not properly blended by the amount of coalescing agent which is present, they can be brought together by special treatment, say by mild mechanical action with a brush or by bathing in a bath containing a suitable coalescing agent, or by both.

The amount of emulsifying agent that remains in the deposit does not in general impair it, the final coating being for ordinary purposes as useful as those prepared in other ways. Where the minimum amount of mineral matter is desired in the deposit, for instance, when its electrical resistance is to be emphasized, the emulsifying agent may be in the form of an ammonium soap. The ammonia can be split off and driven away by heating to a temperature which will not impair the coating.

Having thus described our invention, what we claim as new and desire to secure by Letters Patent is:

1. An aqueous emulsion containing in the disperse phase an electrodepositable cellulosic compound, sufficient coalescing agent for said compound being present in the emulsion to cause the deposited particles of said compound to blend.

2. An aqueous emulsion containing droplets of mixed cellulosic compound and a coalescing agent therefor, the latter being present in sufficient quantity to cause said droplets to blend when deposited.

3. An aqueous emulsion comprising in the disperse phase droplets of an electrodepositable cellulosic compound and a softener therefor.

4. An aqueous emulsion comprising in the disperse phase droplets containing an electrodepositable cellulosic compound together with a softener and a coalescing agent.

5. An aqueous emulsion comprising in the disperse phase an electrodepositable cellulosic compound, a coalescing agent and a protective colloid.

6. An aqueous emulsion comprising in the disperse phase electrodepositable nitrocellulose, there being a coalescing agent present in the emulsion.

7. An aqueous emulsion comprising in the disperse phase droplets containing a mixture of nitrocellulose and sufficient coalescing agent to cause the particles thereof to blend, when deposited.

8. The process of preparing an aqueous emulsion containing an electrodepositable cellulosic compound in the disperse phase, which comprises dissolving said cellulosic compound to form a flowable solution thereof and emulsifying said solution in an aqueous bath.

9. The process of making an aqueous emulsion containing in the disperse phase an electrodepositable cellulosic compound and a coalescing agent therefor, which comprises dissolving said compound to form a flowable solution in a solvent liquid containing said coalescing agent, and emulsifying said solution in an aqueous bath containing an emulsifying agent.

10. The process of making an aqueous emulsion containing in the disperse phase a cellulosic compound, which comprises preliminarily mixing said compound into an aqueous bath, and then homogenizing said mixture by intensive agitation.

11. The process of making an aqueous emulsion containing in the disperse phase an electrodepositable cellulosic compound, which comprises mixing said compound into an aqueous bath containing a protective colloid, and then submitting the mixture to intensive agitation until a stable uniform emulsion results.

12. The process of making an aqueous emulsion containing in the disperse phase droplets of electrodepositable cellulosic compound and a coalescing agent therefor, which comprises dissolving said compound in said coalescing agent to produce a flowable solution, preliminarily mixing said solution into an aqueous bath, and thereafter homogenizing said mixture by intensive agitation.

Signed at Rochester, New York, this 2nd day of April 1925.

CARL L. BEAL.
LEON W. EBERLIN.